United States Patent
Dai et al.

(10) Patent No.: US 11,812,081 B2
(45) Date of Patent: Nov. 7, 2023

(54) SESSION BASED ADAPTIVE PLAYBACK PROFILE DECISION FOR VIDEO STREAMING

(71) Applicant: HULU, LLC, Santa Monica, CA (US)

(72) Inventors: Tongyu Dai, Beijing (CN); Lan Xie, Beijing (CN); Wenhao Zhang, Beijing (CN); Deliang Fu, Beijing (CN); Chao Li, Beijing (CN); Qiang She, Beijing (CN); Yuting Gui, Beijing (CN); Yicheng Liu, Beijing (CN); Xizhi Xu, Beijing (CN)

(73) Assignee: HULU, LLC, Santa Monica, CA (US)

( * ) Notice: Subject to any disclaimer, the term of this patent is extended or adjusted under 35 U.S.C. 154(b) by 228 days.

(21) Appl. No.: 17/087,255

(22) Filed: Nov. 2, 2020

(65) Prior Publication Data

US 2022/0141513 A1    May 5, 2022

(51) Int. Cl.
*H04N 21/2662* (2011.01)
*H04L 65/75* (2022.01)
(Continued)

(52) U.S. Cl.
CPC ....... *H04N 21/2662* (2013.01); *G06F 18/214* (2023.01); *G06N 3/08* (2013.01);
(Continued)

(58) Field of Classification Search
CPC .......... H04N 21/2662; H04N 21/2402; H04N 21/25808; H04N 21/47217; H04N 21/2187; H04N 21/238; H04N 21/4126; H04N 21/47202; H04N 21/654; H04N 21/234; H04N 21/2385; H04N 21/44;
(Continued)

(56) References Cited

U.S. PATENT DOCUMENTS 9,578,395 B1 * 2/2017 Qureshi ............. H04N 21/8586
10,178,043 B1 * 1/2019 Ganjam ................ H04L 65/764
(Continued)

FOREIGN PATENT DOCUMENTS

EP          1014480        6/2022
JP       2014509109 A      4/2014
(Continued)

OTHER PUBLICATIONS

International Search Report and Written Opinion for International Application No. PCT/US2020/04566 dated Oct. 26, 2020, 10 pages.
(Continued)

*Primary Examiner* — Robert J Hance
(74) *Attorney, Agent, or Firm* — Kwan & Olynick LLP

(57) ABSTRACT

In some embodiments, a method receives session features for a session associated with a request for a video from a client and predicts network conditions for the session using the session features. A subset of available profiles is selected based on the network conditions. The available profiles are associated with a different playback characteristic. The method provides a profile ladder that includes the subset of available profiles for the playback of the video to the client. The profile ladder restricts the client to using the subset of available profiles to request segments of the video during the session.

22 Claims, 12 Drawing Sheets

(51) Int. Cl.
*H04N 21/24* (2011.01)
*H04N 21/258* (2011.01)
*G06N 3/08* (2023.01)
*G06F 18/214* (2023.01)

(52) U.S. Cl.
CPC ......... *H04L 65/75* (2022.05); *H04N 21/2402* (2013.01); *H04N 21/25808* (2013.01)

(58) Field of Classification Search
CPC .... H04N 21/4621; G06K 9/6256; G06N 3/08; H04L 65/75; H04L 65/612; H04L 65/752; H04L 65/80; H04L 67/30
See application file for complete search history.

(56) References Cited

U.S. PATENT DOCUMENTS

| | | | |
|---|---|---|---|
| 11,025,987 | B2 | 6/2021 | Xie et al. |
| 11,102,260 | B1* | 8/2021 | Wu ................ H04L 65/612 |
| 2006/0026294 | A1 | 2/2006 | Virdi et al. |
| 2011/0066673 | A1 | 3/2011 | Outlaw |
| 2011/0082924 | A1 | 4/2011 | Gopalakrishnan |
| 2011/0082946 | A1* | 4/2011 | Gopalakrishnan ...... H04L 65/80 709/231 |
| 2012/0265901 | A1* | 10/2012 | Swenson ........ H04N 21/234309 709/246 |
| 2013/0042013 | A1* | 2/2013 | Bouazizi .......... H04N 21/26258 709/227 |
| 2013/0163430 | A1* | 6/2013 | Gell .................. H04N 21/6131 370/235 |
| 2014/0025830 | A1 | 1/2014 | Grinshpun et al. |
| 2015/0201042 | A1* | 7/2015 | Shah .................... H04L 65/765 709/219 |
| 2016/0112484 | A1* | 4/2016 | Liu ...................... H04L 65/613 709/231 |
| 2016/0192029 | A1 | 6/2016 | Bergstrom |
| 2019/0069039 | A1* | 2/2019 | Phillips ............ H04N 21/64738 |
| 2020/0099733 | A1* | 3/2020 | Chu .................. H04N 21/8456 |

FOREIGN PATENT DOCUMENTS

| | | | |
|---|---|---|---|
| JP | 2022545623 | A | 10/2022 |
| KR | 1020160031642 | A | 3/2016 |
| KR | 1638509 | B1 | 7/2016 |
| KR | 1020170135069 | A | 12/2017 |
| KR | 101982290 | B1 | 5/2019 |
| KR | 10-2019-0088380 | A | 7/2019 |
| WO | WO-2011139305 | A1 * | 11/2011 ......... H04L 29/0809 |

OTHER PUBLICATIONS

Related U.S. Appl. No. 16/541,999, filed Aug. 15, 2020, 48 pages, unpublished.
European Application Serial No. 21205683.2, Search Report dated Mar. 22, 2022, 21 pgs.
Indian Application Serial No. 202144047751, Office Action dated Jun. 3, 2022, 5 pgs.
Indian Application Serial No. 202247005563, Office Action dated Jun. 17, 2022, 6 pgs.
International Application Serial No. PCT/US2020/045666, Preliminary Report on Patentability dated Feb. 24, 2022, 7 pgs.
Japanese Office Action, Application No. JP2021177591, dated Nov. 29, 2022, 10 pages. English and Japanese versions.
Japanese Office Action—Decision of Rejection, dated Jun. 6, 2023, Application No. JP2021-177591, 7 pages.
Korean Office Action, Notice of Grounds for Rejection, dated Aug. 18, 2023, in Korean Patent Application No. 10-2021-0148207, 17 pages (with English Translation).
Chinese Office Action, dated Sep. 1, 2023, CN Application No. 202111269905.5, 28 pages (with ENG Translation).
Chinese Search Report, dated Aug. 28, 2023, for CN Application No. 202111269905.5, 3 pages.

* cited by examiner

SESSION BASED ADAPTIVE PLAYBACK PROFILE DECISION FOR VIDEO STREAMING

BACKGROUND

In video streaming, a profile ladder lists different profiles that are available for a client to use when streaming segments of a video. Each profile may be associated with a different level, such as different levels of bitrate. Accordingly, when network conditions are good, the client can request a profile with a higher bitrate. Conversely, when network conditions deteriorate, the client can request a profile with a lower bitrate. A video delivery system would like to provide clients with a video profile that has a higher bitrate when good network conditions are being experienced, which improves the quality of the video being streamed. When bad network conditions are being experienced, the video delivery system would like to provide clients with a profile with a lower bitrate such that the clients can play the video without any playback issues, such as rebuffering or downloading failures.

The profile ladder may be the same for all sessions for clients on a platform. For example, all mobile clients on the mobile device platform may receive the same profile ladder. Using the same profile ladder may not provide optimal playback conditions because different mobile clients may experience different network conditions. For example, when the available network bandwidth exceeds the bitrate of the highest profile in the profile ladder, the client is not receiving the highest possible quality video that could be played via the available bandwidth. Also, when the available network bandwidth is lower than the minimum bitrate of a lowest profile in the profile ladder, the client may experience rebuffering because there is not enough available network bandwidth to stream the video at the lowest bitrate provided by the lowest profile in the profile ladder. Accordingly, the profiles in the profile ladder are not optimizing the playback experience for the client.

BRIEF DESCRIPTION OF THE DRAWINGS

With respect to the discussion to follow and in particular to the drawings, it is stressed that the particulars shown represent examples for purposes of illustrative discussion, and are presented to provide a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

Described herein are techniques for a video streaming system. In the following description, for purposes of explanation, numerous examples and specific details are set forth to provide a thorough understanding of some embodiments. Some embodiments as defined by the claims may include some or all of the features in these examples alone or in combination with other features described below and may further include modifications and equivalents of the features and concepts described herein.

A video delivery system may use an adaptive profile ladder that can be adapted dynamically, such as per session. A profile prediction system can predict the network conditions for a session before the session starts. Then, the profile prediction system uses the predicted network conditions to select a profile ladder for the session. Also, during playback, if the network conditions have changed from the predicted network conditions, an in-session profile adapter may adjust the profile ladder accordingly, such as by adding a lower profile with a lower bitrate or a higher profile with a higher bitrate.

Using the adaptive profile ladder may improve the playback of videos. For example, predicting the network conditions and adapting the profile ladder to those predicted network conditions may provide profiles to a client that are more suitable for the network conditions that may be experienced during the current session. Accordingly, the video delivery system adaptively calculates the profile ladder per session for different clients instead of using a fixed profile ladder for the clients, such as per platform (e.g., a mobile device platform, living room device platform, etc.). In this case, the video delivery system may adapt the profile ladder for clients on the same platform and also for clients on different platforms. Because different sessions may experience different network conditions, the adaptive profile ladder may include profiles that are more appropriate for the network conditions that may be experienced in the respective sessions. Also, if network conditions change, the in-session profile adapter can adapt to these changing network conditions to add different profiles that may be more appropriate or remove profiles that may no longer be appropriate. Accordingly, the playback of the video may be resilient to changes in network conditions.

System Overview

Figure 1:
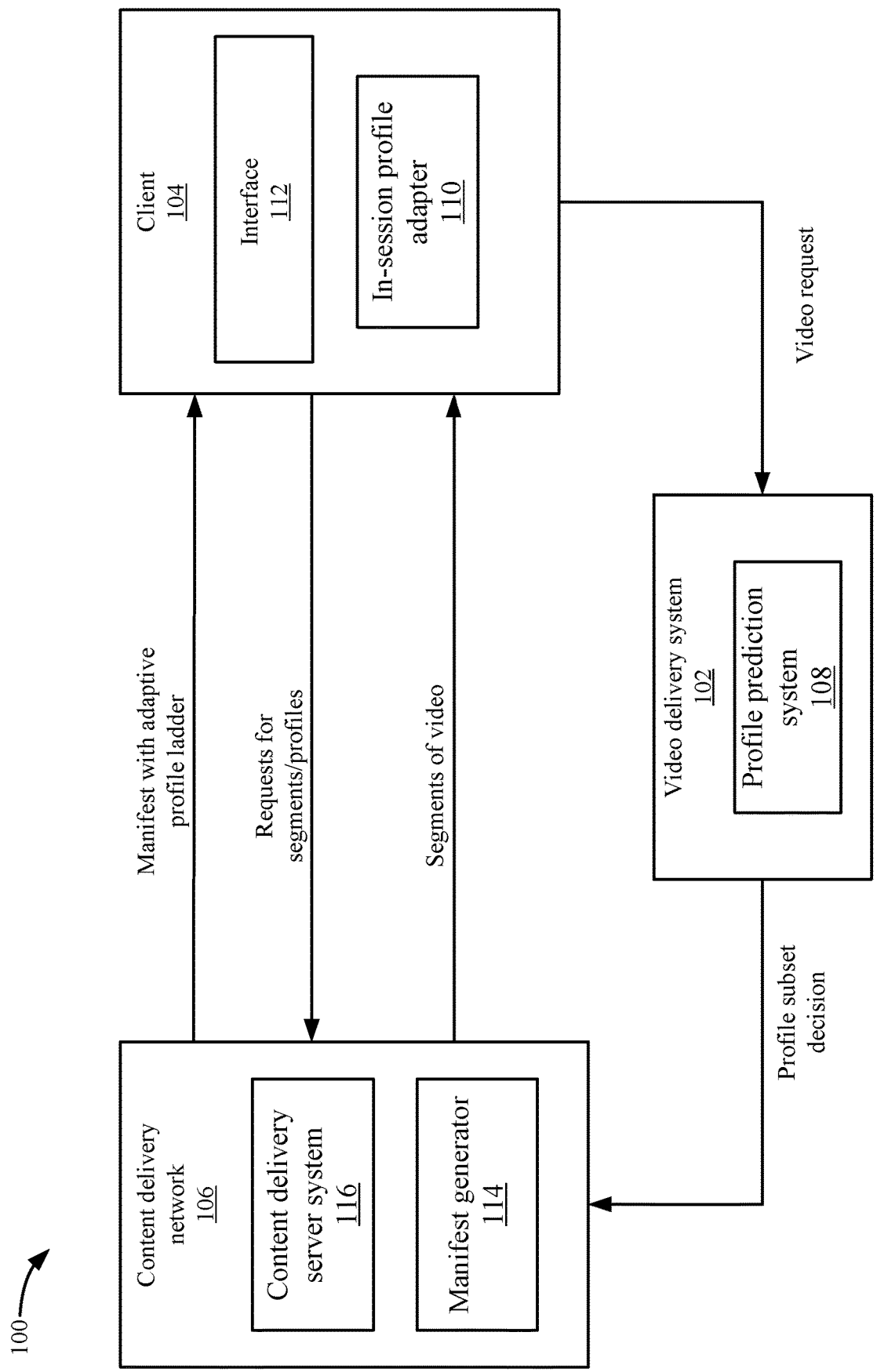
FIG. 1 depicts a simplified system for generating an adaptive profile ladder according to some embodiments.

FIG. 1 depicts a simplified system 100 for generating an adaptive profile ladder according to some embodiments. System 100 includes a video delivery system 102, a client 104, and a content delivery network 106. Video delivery system 102, content delivery network 106, and client 104 may be implemented using one or more computing devices. Also, although single instances of video delivery system 102, content delivery network 106, and client 104 are shown, it will be understood that system 100 may include more than one video delivery system 102, content delivery network 106, and/or client 104. For instance, video delivery system 102 may communicate with multiple clients 104, and content delivery network 106 may send videos to clients 104 via multiple servers, etc. Also, even though video delivery system 102, content delivery network 106, and client 104 are shown as separate entities, the functions performed by them may be distributed between them or to other entities.

Video delivery system 102 may provide a video delivery service that allows client 104 to request videos, such as videos on-demand or live videos from live television. Video delivery system 102 may provide an application that is displayed in an interface 112 at client 104. A user account may log onto the application to access the video delivery service. Then, video delivery system 102 may receive a video request from client 104 and process the video request to allow client 104 to stream the video.

Client 104 may include a computing device that can playback a video in interface 112, such as via a media player (not shown). Client 104 may include a mobile phone, smartphone, set top box, television, living room device, tablet device, etc. Clients 104 may operate on a platform, which may be classified by a type of device that operates on the platform. For example, platforms include mobile device platforms, living room device platforms, etc. A user account that is used by a user may use client 104 to access the video delivery service. For example, the user account may log in to the video delivery service to identify information for the user account. When client 104 receives a request for a video from the user account, client 104 may send the video request to video delivery system 102 for that video.

Content delivery network 106 includes servers that can deliver a video to client 104. For example, a content delivery server system 116 may include one or more servers that can deliver the video to client 104. In some embodiments, content delivery server system 116 delivers segments of video to client 104. The segments may be a portion of the video, such as six seconds of the video. As is known, a video may be encoded in multiple profiles that correspond to different levels, which may be different levels of bitrates and/or quality. Client 104 may request a segment of video from one of the profile levels based on current playback conditions. For example, client 104 may use an adaptive bitrate algorithm to select the profile for the video based on the current available bandwidth and other network conditions.

In the process to start playback of a video, video delivery system 102 may receive the request for the video from client 104. Video delivery system 102 may select a content delivery network 106 and provide the information to content delivery network 106 and/or client 104 to allow the video to be streamed between content delivery network 106 and client 104. Video delivery system 102 may also provide different information, such as a playback configuration and a media presentation description. The playback configuration may include available protocols for streaming, etc. The media presentation description may include information on profiles that are available, segment duration, and other characteristics of the video.

Video delivery system 102 adaptively determines the profile ladder that is used in the session to stream the video between content delivery network 106 and client 104. The profile ladder includes the profiles that are available to client 104 to request in the session. The profiles may be classified at different levels and each level may be associated with a different characteristic. For example, each level may be associated with a different bitrate, such as 400 kilobytes per second (kbps), 650 kbps, 1000 kbps, 1500 kbps, . . . 12000 kbps. However, a level may be associated with a characteristic other than bitrate, such as a quality characteristic (e.g., resolution). In some embodiments, the level may be determined based on how the video is encoded for the level, such as the video is encoded at the 400 kbps level for a profile associated with 400 kbps.

In some embodiments, there may be X number of profiles available, such as 12 profiles, but only a subset of those profiles may be used during the session, such as seven. Although these numbers of profiles are discussed, it will be understood that different numbers of profiles may be available and/or the subset may include different numbers of profiles. Accordingly, because only a subset of the profiles is used, it is important to provide client 104 with a selection of profiles in the profile ladder that may be useful under the network conditions being experienced by client 104. A profile prediction system 108 generates a profile subset that is adapted for the session. Although generating an adaptive profile ladder is described for a session, an adaptive profile ladder may be applied to multiple sessions, such as to multiple requests for videos from the same client, or to sessions with other clients. The adaptive profile ladder is different from a fixed ladder because the adaptive profile later is generated based on characteristics associated with a client 104. As will be discussed in more detail below, profile prediction system 108 may predict network conditions for the session, and then use the network conditions to generate a profile subset decision. The profile subset decision may identify a subset of the available profiles to include in the profile ladder for the session. Then, video delivery system 102 may provide the profile subset decision to content delivery network 106 and/or client 104.

Content delivery network 106 may receive the video request and the profile ladder that reflects the profile subset decision. A manifest generator 114 may generate the manifest for client 104. The manifest may list information for segments of video that can be requested by client 104 and any other information required to playback the segments of video. The information may include links that client 104 may use to request a segment for playback. In some embodiments, the manifest lists all the available profiles for each segment, such as the manifest includes a link for each profile per segment. Client 104 can select one of the links to request playback of a segment.

As discussed above, the profile ladder may restrict client 104 to a subset of profiles. Different methods may be used to enforce the restriction. For example, manifest generator 114 may insert information in the manifest that identifies the profile subset in the profile ladder that can be used by client 104. In other embodiments, content delivery network 106 may send the profile ladder in other ways, such as in metadata or in a control channel. Also, video delivery system 102 may send information for the subset of profiles in the profile ladder to client 104, which may then only select from the profiles in the subset. Accordingly, even if the manifest includes links to all the profiles, the profile ladder restricts the profiles that client 104 can request from the manifest.

In some embodiments, the logic of content delivery network 106 may remain unchanged during the delivery of segments as content delivery network 106 receives requests for segments for the respective profiles. Client 104 determines the profiles in the profile ladder that can be used and sends requests for those profiles. The restriction may be applied at client 104, and not content delivery network 106. Content delivery network 106 may provide a manifest with all the profiles and responds to requests for links without having to add or remove profiles from the manifest based on the adaptive profile ladder. However, content delivery network 106 may provide a manifest with only the subset of profiles provided in the profile ladder.

When client 104 receives the manifest, client 104 can send requests for segments that are associated with a profile. For example, client 104 may select a link for a segment that is associated with a desired bitrate. Content delivery server system 116 may then send the segment of video for the requested profile to client 104, which can then display the segments in the media player on interface 112. As discussed above, client 104 may change the profiles requested for segments based on current network conditions.

It is possible that the network conditions may change during the session. To adapt to the changing network conditions, in-session profile adapter 110 may analyze the current network conditions being experienced at client 104 and determine if the profile ladder should be adjusted. For example, in-session profile adapter 110 may add or remove profiles from the profile ladder. The addition or removal may force client 104 to request profiles that may be better suited for the network conditions being experienced or not request profiles that are not optimally suited for the current conditions being experienced. If unsuitable profiles are included in the profile ladder, it is possible that client 104 may select the undesirable profile.

Profile Ladder Prediction

Figure 2:
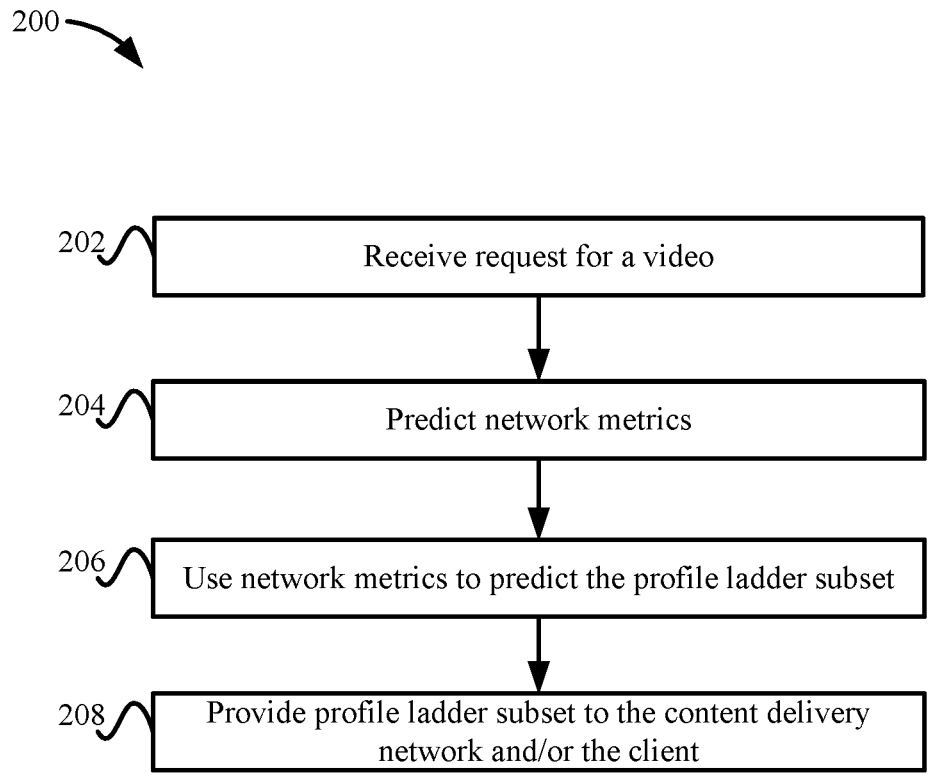
FIG. 2 depicts a simplified flowchart of a method for predicting the profile subset according to some embodiments.

When a video request is received, profile prediction system 108 predicts the profile subset to use in the current session. FIG. 2 depicts a simplified flowchart 200 of a method for predicting the profile subset according to some embodiments. At 202, video delivery system 102 receives a request for a video for a session. The request for the video may include identification of a user account and other information, such as device type, location, etc.

At 204, profile prediction system 108 may predict network metrics for the session. In some embodiments, the network metrics may include different metrics that describe aspects of video delivery or playback, such as network bandwidth, a rebuffer ratio, and a failure ratio. Network bandwidth may be the available network bandwidth that is measured for the session, the rebuffer ratio may be based on a measurement of rebuffer occurrences compared to successful playback of segments during playback, and the failure ratio may be based on a measurement the number of times the downloading of a segment fails compared to successful downloads. Other network metrics may also be used.

At 206, profile prediction system 108 uses the network metrics to predict the subset of profiles for the profile ladder. The prediction may predict the subset of profiles from an available profile list. As discussed above, client 104 may not be able to select all the profiles from the entire available profile list; rather, a subset of the available profiles is selected for the profile ladder.

At 208, video delivery system 102 provides the profile ladder to content delivery network 106 and/or client 104. The profile ladder identifies the subset of available profiles that can be used in the session by client 104.

Figure 3:
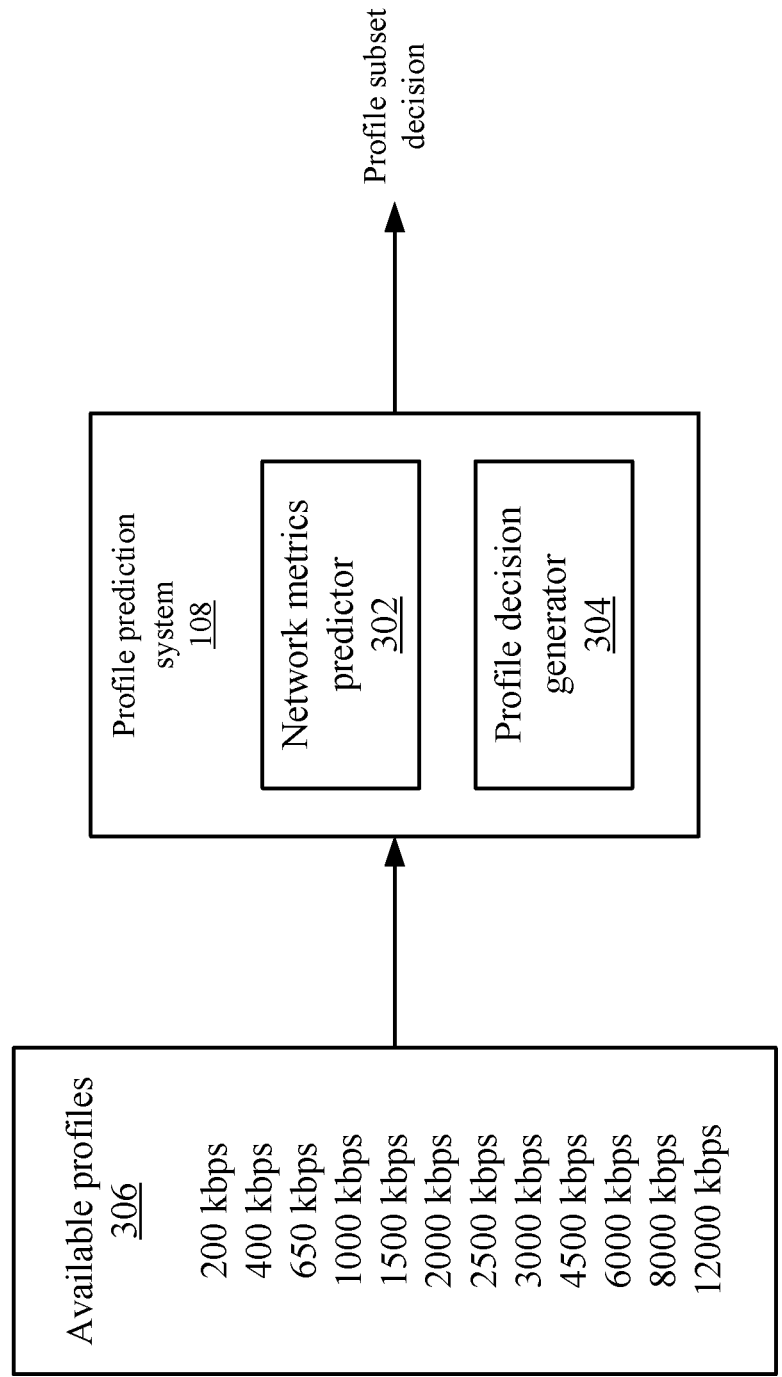
FIG. 3 depicts a more detailed example of a profile prediction system according to some embodiments.

FIG. 3 depicts a more detailed example of profile prediction system 108 according to some embodiments. Profile prediction system 108 receives available profiles 306, which lists all the profiles that may be used in a profile ladder. The profile levels are classified as bitrates in this example, but could be classified using different characteristics. As shown, the available profiles start at 200 kbps as the lowest bitrate and include profiles up to 12000 kbps at the highest bitrate. In this example, available profiles 306 include 12 profiles, but different numbers of profiles may be available.

In some embodiments, profile prediction system 108 receives a restriction for the number of profiles that can be included in a profile ladder. For example, a profile ladder may be restricted to seven profiles, but the restriction may restrict the profile ladder to different numbers of profiles. However, the restriction may be less than the number of available profiles.

Figure 4:
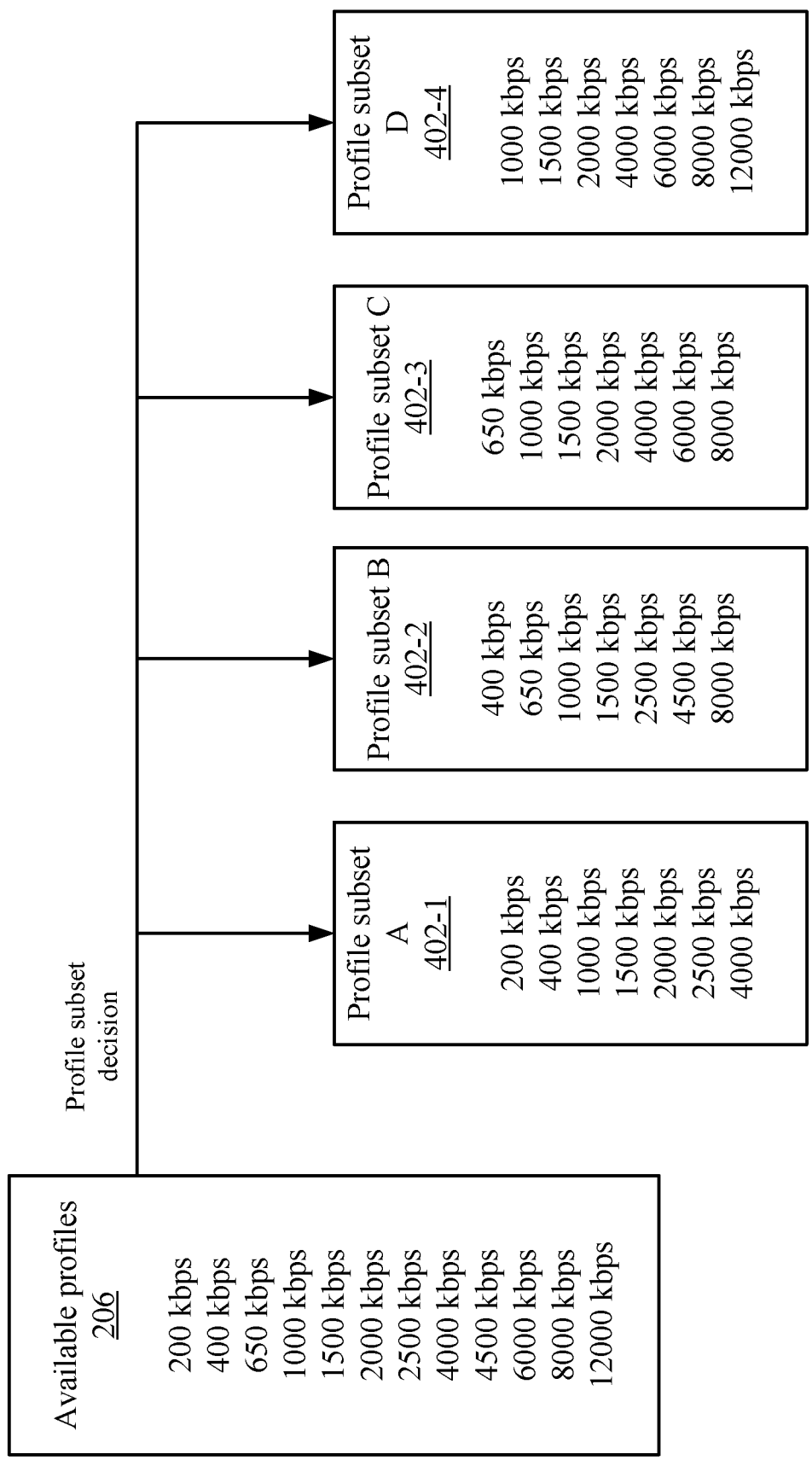
FIG. 4 depicts an example of different profile subsets that can be selected for a profile ladder according to some embodiments.

FIG. 4 depicts an example of different profile subsets that may be selected for a profile ladder according to some embodiments. Four profile subsets are shown as profile subset A 402-1, profile subset B 402-2, profile subset C 402-3, and profile subset D 402-4; however, other profile subsets may be appreciated. Each profile subset 402 may be different in that a subset includes at least one different profile in some embodiments. The goal for the subsets may be to capture profiles that may be better suited for the network conditions being experienced at client 104. For example, profile subset A 402-1 may have profiles that are skewed towards lower bitrates, such as the lowest bitrate of 200 kbps is included in profile subset A 402-1. Also, profile subset A 402-1 includes a highest bitrate profile of 4000 kbps. Profile subset A 402-1 may work better when the network conditions are predicted to have available bandwidth that is lower than 4000 kbps.

Profile subset B 402-2 may include some profiles that are more optimal for a slightly higher bitrate distribution than profile subset A 402-1. For example, the lowest bitrate in profile subset B 402-2 is 400 kbps. In this case, if client 104 is experiencing a low bitrate at 200 kbps, client 104 would not be able to switch to the 200 kbps profile and may experience rebuffering because the network bandwidth is less than the bitrate of the video. However, if client 104 is experiencing available bandwidth above 4000 kbps, client 104 can choose from the 4500 kbps profile and the 8000 kbps profile.

Profile subset C 402-3 includes profiles that may be optimal for a client 104 that is experiencing a higher available bandwidth than profile subset B 402-2. For example, profile subset C 402-3 includes a lowest profile with a bitrate of 650 kbps and includes the highest profile of 8000 kbps. Also, profile subset C 402-3 includes the 6000 kbps profile to include more options at higher bitrates. Lastly, profile subset D 402-4 may be for a client 104 that is experiencing the highest predicted available bandwidth distribution. In this case, profile subset D 402-4 includes a lowest profile with 1000 kbps and the highest profile of 12000 kbps.

Referring back to FIG. 3, network metric predictor 302 may predict the network conditions before playback of a respective session. In some embodiments, network metrics predictor 302 may output the predicted network bandwidth and also one or more quality of service (QoS) metrics. The predicted network bandwidth may be the predicted available bandwidth during the session. The QoS metrics may be different metrics that measure the quality of service that is predicted during the session. For example, QoS metrics may include a rebuffer ratio and a failure ratio.

Once the network metrics are predicted, a profile decision generator 304 generates the profile subset decision. In some embodiments, profile decision generator 304 may analyze the network conditions and select an appropriate profile ladder based on the network conditions. For example, when the network conditions are associated with a low available bandwidth, higher rebuffer ratios, and/or higher failure ratios, then profile decision generator 304 may select a profile subset that includes lower bitrates. The profile subset with lower bitrates is selected to minimize the rebuffer or failure occurrences during playback. However, when the network conditions are better, such as the network bandwidth is predicted to be high, rebuffer ratios are predicted to be low, and/or failure ratios are predicted to be lower, then profile decision generator 304 selects a profile subset associated with higher bitrates. The profile subset with a higher bitrate distribution is selected to allow client 104 to request higher bitrates to improve the quality of playback.

Profile decision generator 304 may use different methods to generate the profile subset. In some embodiments, profile decision generator 304 may select the profile subset from pre-generated profile subsets as shown in FIG. 4. In other embodiments, profile decision generator 304 may generate the profile subset dynamically based on the network conditions. These processes will be described in more detail below. Now, the training of profile prediction system 108 will be discussed and then the prediction in more detail.

Training

Figure 5:
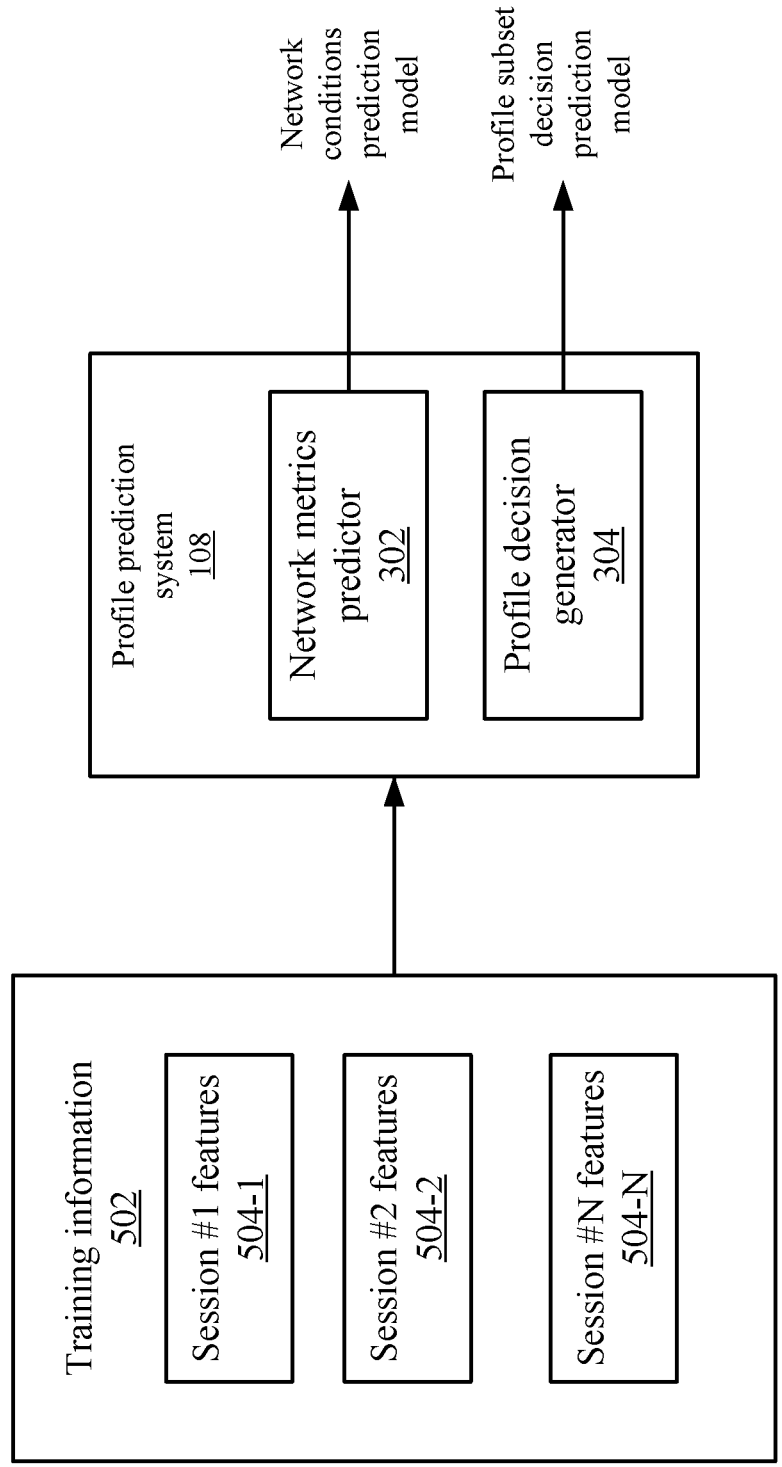
FIG. 5 depicts an example of training a profile prediction system according to some embodiments.

FIG. 5 depicts an example of training profile prediction system 108 according to some embodiments. In some embodiments, either network metrics predictor 302 and profile decision generator 304 may use a prediction model that includes parameters that can be used to predict the network conditions or the profile subset decision as discussed above. In other embodiments, network metrics predictor 302 and profile decision generator 304 may use a rules-based system. The following will first describe both network metrics predictor 302 and profile decision generator 304 using a prediction model to generate the profile subset decision, but a rules-based process may be used for either network metrics predictor 302 and profile decision generator 304 as will be discussed below.

Training information 502 may include historical session features, such as session #1 features 504-1, session #2 features 504-2, . . . , and session #N features 504-N. Session features may be extracted from historical sessions from a specific user account. Also, session features 504 may be extracted from other user accounts. The following may be some of the features that may be used to characterize the session.

TABLE I

| Category | Feature | Description |
|---|---|---|
| User | Device platform | The client device platform for the current session. |
| | User Country | The country where the client is located, e.g., USA. |
| | User region | The state where the client is located, e.g., Washington, etc. |
| | User city | The city where the client is located, e.g., Seattle, etc. |

TABLE I-continued

| Category | Feature | Description |
|---|---|---|
| | ISP | The Internet service provider (ISP) of the client IP's address. |
| Network | Network type | The kind of current network being used by the client, e.g., WiFi, 4G, etc. |
| | CDN | The content delivery network (CDN) used in the playback session. |
| Context | In peak hour | Whether the current session happens in the peak hour (7:00 PM-11:00 PM of local time). |
| | Day of week | Day of the week. |
| | Hour of day | Hour of the day. |
| | Previous bandwidth | The bandwidth status of the client's last session. |
| | Previous QoS | The quality of service (QoS) of the client's last session, including rebuffer ratio and failure ratio. |

The features listed in Table I may or may not be used, and other features may also be used. In some embodiments, the features may be associated with the categories of a user, a network, and a context. The user features may be associated with characteristics of a user account or a client. The network features may be associated with network metrics during playback sessions. The context may be information related to the session playback.

In some embodiments, the user account features include a device platform, a user country, a user region, a user city, and an Internet service provider (ISP). The device platform may be the platform associated with client 104, such as a mobile device, living room device, etc. The user country may be where client 104 or the user account is located, such as the USA. The user region may be the state where client 104 or the user account is located, such as Washington. The user city may be the city where client 104 or the user account is located, such as Seattle. The ISP may be the Internet provider being used by client 104.

In the network category, the network type may be the network used by client 104 during a session, such as WiFi, 4G, etc. The content delivery network may be the CDN that was used in the associated playback session.

In the context category, the features may include in-peak hour, day of the week, hour of the day, previous bandwidth, and previous quality of service (QoS). The in-peak hour feature may be whether the associated session happens during a peak hour, which may be from 7:00 p.m. to 11:00 p.m. of local time. The day of the week may be the day of the week that is associated with the session, and the hour of the day is the hour of the day that is associated with the session. The previous bandwidth may be the bandwidth status experienced during the last session associated with the user account. The previous QoS may be the previous QoS metrics from the last session associated with the user account, which may include the rebuffer ratio and the failure ratio that were experienced during the session.

Prediction profile system 108 receives session features 504 and can train prediction models for network metrics predictor 302 and/or profile decision generator 304. In some embodiments, the network conditions are predicted instead of predicting a profile subset directly because the statistics that can be collected from the sessions include the bandwidth experienced and the QoS metrics. This allows the parameters to be trained accurately because the ground truth of the bandwidth and the QoS metrics is known for certain feature sets. That is, the actual bandwidth experienced during a session is known and can be correlated to the session features. The training process may input session features 504 into the model and train the model's parameters based on the output of the model and the ground truth of the bandwidth and the QoS metrics.

The network conditions that were predicted can be used to train profile subset decision prediction model by using rating of the session and ground truth information from historical sessions (e.g., network bandwidth, rebuffer ratio, failure ratio, and the profile ladder used in that session). Session features 504 may be rated with ratings, such as being a good session (e.g., no rebuffering occurred) or a bad session (e.g., rebuffering occurred). The ground truth features are input into profile decision generator 304 to train the parameters of the model based on whether the sessions were classified as good sessions or bad sessions. The features of a current session can be input into profile decision generator 304 and profile decision generator 304 predicts whether the available profile ladders will result in good or bad sessions. The profile ladder with the highest bandwidth distribution that is predicted to be a good session may be selected.

It is noted that different methods to train network metrics predictor 302 and profile decision generator 304 may be appreciated. After training, network conditions prediction model and a profile subset decision prediction model are generated and can be used during real-time execution.

Network Metrics Prediction

Figure 6:
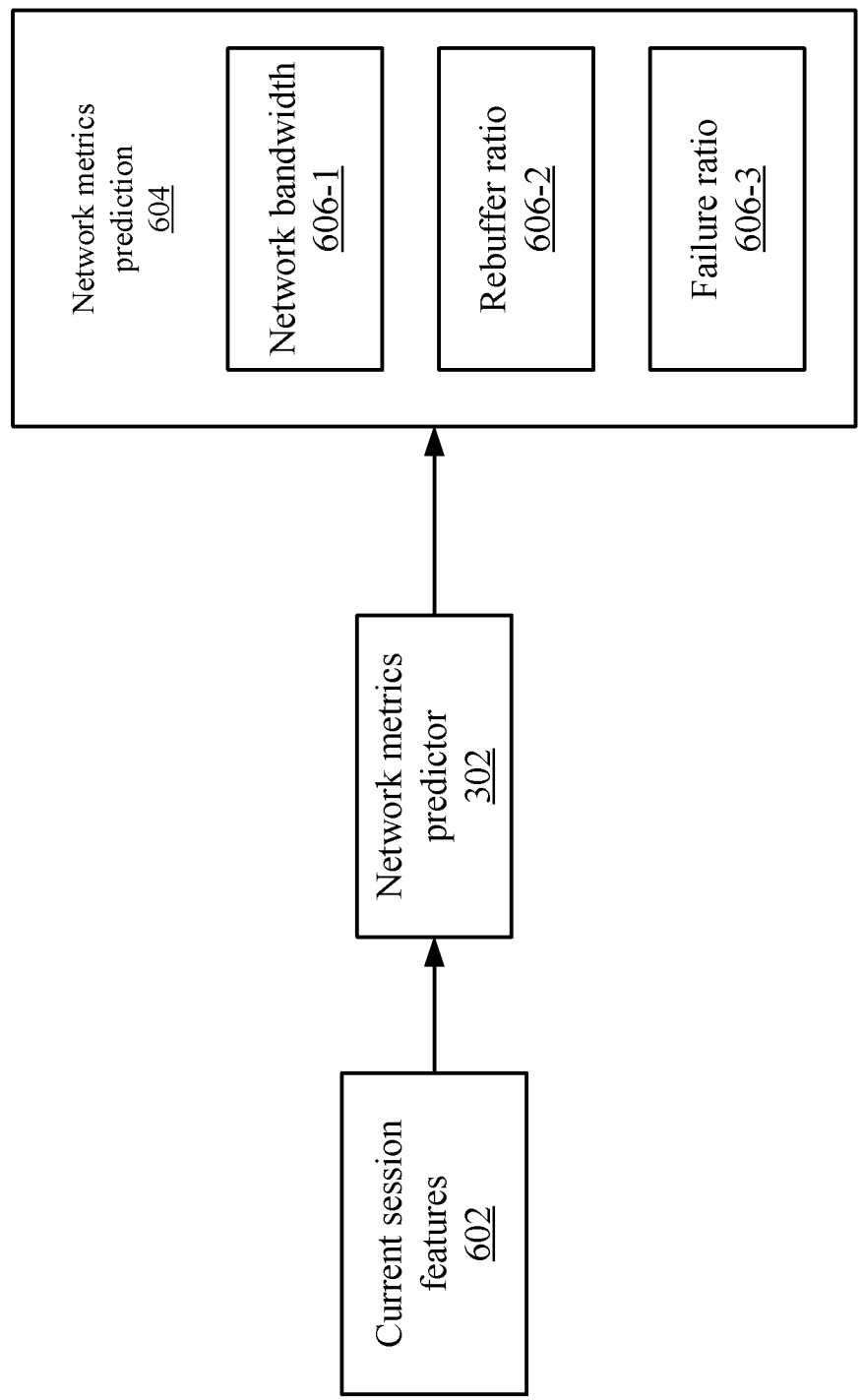
FIG. 6 depicts a more detailed example of network metrics prediction according to some embodiments.

FIG. 6 depicts a more detailed example of network metrics prediction according to some embodiments. Network metrics predictor 302 receives session features 602. Current session features 602 may include information for the features described in Table I. For example, video delivery system 102 may receive the user account that requested the video and retrieve the features for that user account.

Network metrics predictor 302 inputs session features 602 into the trained network conditions prediction model to output a network metrics prediction 604. For example, network metrics prediction 604 includes a network bandwidth 606-1, a rebuffer ratio 606-2, and a failure ratio 606-3. In a simplified example, network bandwidth 606-1 may be high if the session features 602 are similar to historical features that resulted in high network bandwidth. Also, rebuffer ratio 606-2 and failure ratio 606-3 may be similar to rebuffer ratios and failure ratios for features that were similar to current session features 602. Network metrics predictor 302 then outputs network metrics prediction 604 to profile decision generator 304.

Also, network metrics predictor 302 may use a rules-based process to predict network metrics prediction 604. Network metrics predictor 302 applies rules to current session features to generate values for a network bandwidth 606-1, a rebuffer ratio 606-2, and a failure ratio 606-3. For example, some features may map to higher network bandwidths, some features may map to lower rebuffer ratios, etc.

Profile Subset Decision

Profile subset decision generator 304 may use a prediction model or a rules-based method to determine the profile subset decision. The prediction model approach is described in FIG. 7 and the rules based approach is described in FIG. 8.

Figure 7:
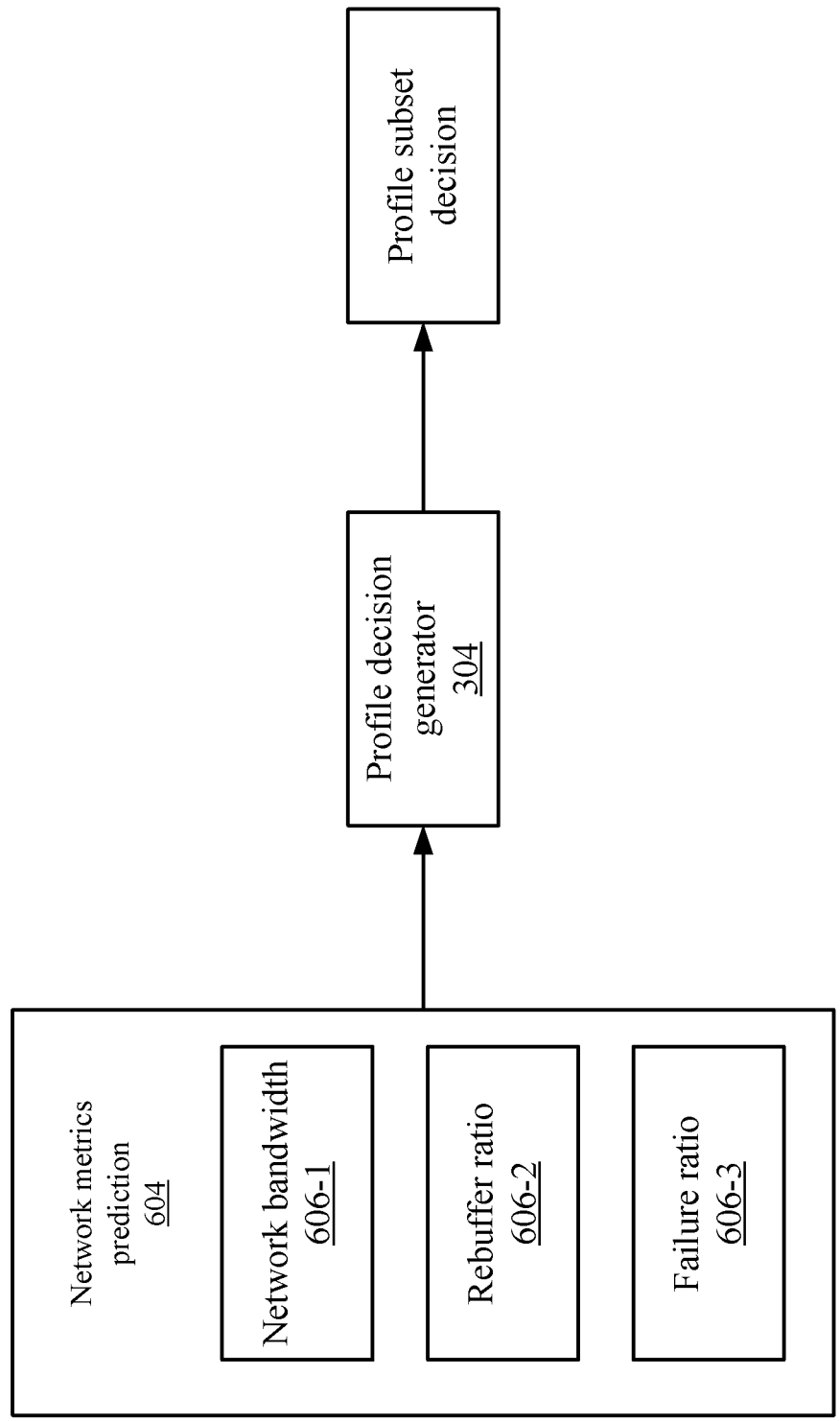
FIG. 7 depicts an example of generating a profile subset decision using a prediction model according to some embodiments.

FIG. 7 depicts an example of generating a profile subset decision using a prediction model according to some embodiments. Profile decision generator 304 may use the trained profile subset decision prediction model. In this case, network metrics prediction 604 (e.g., network bandwidth 606-1, rebuffer ratio 606-2, and failure ratio 606-3) are input into profile decision generator 304. Then, profile decision generator 304 outputs a profile subset decision. The profile subset decision may be one of the selected profile subsets A, B, C, or D. In other examples, the profile subset decision may output the specific profiles to be included in the profile ladder. For example, profile decision generator 304 may analyze the network metrics and determine the profiles to include in the profile ladder dynamically. Accordingly, profile decision generator 304 may not be restricted to the pre-determined subsets. Dynamically selecting the profiles may provide more flexibility in determining the distribution of profiles for the adaptive profile ladder.

Figure 8:
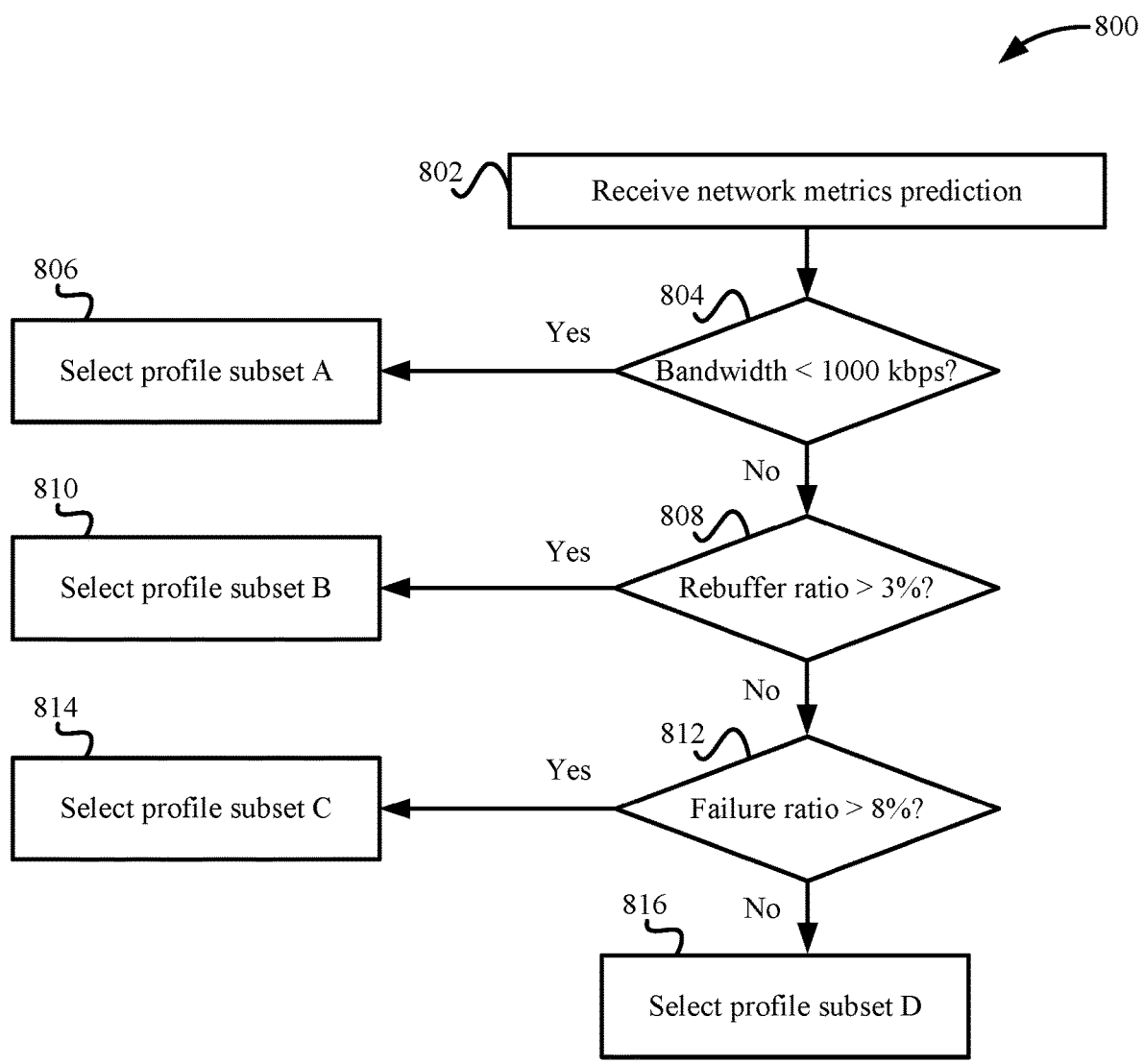
FIG. 8 depicts a simplified flowchart of a method for selecting a profile subset according to some embodiments.

In other examples, profile decision generator 304 may use a rules-based process. FIG. 8 depicts a simplified flowchart 800 of a method for selecting a profile subset according to some embodiments. At 802, profile decision generator 304 receives network metrics prediction 604. Profile decision generator 304 may then apply rules to network metrics prediction 604. The thresholds used for the rules are examples and may be altered. In some examples, at 804, profile decision generator 304 determines if the predicted bandwidth of network bandwidth 606-1 is less than a threshold, such as 1000 kbps. The value of 1000 kbps may be used because this is a lower bitrate and if the bandwidth is less than 1000 kbps, profile decision generator 304 selects profile subset A at 806. Profile decision generator 304 selects profile subset A because this subset is associated with the lowest bitrate distribution of profiles.

If the bandwidth is not less than 1000 kbps, profile decision generator 304 determines if rebuffer ratio 606-2 meets a threshold, such as the rebuffer ratio value is greater than 3%. If the rebuffer ratio 606-2 is greater than 3%, at 810, profile decision generator 304 selects profile subset B. Profile decision generator 304 selects profile subset B because the lower bitrate distribution in profile subset B may reduce the number of rebuffers that occur due to the bitrate of the video being higher than the available bandwidth. For example, if profile subset C or profile subset D is selected, then there will be a higher chance that a higher bitrate profile is selected by client 104, which may result in a higher than desired rebuffer ratio. Profile subset A may not be selected because the predicted bandwidth is not less than 1000 kbps and the profile with the lowest bitrate distribution may not be needed.

At 812, if rebuffer ratio 606-2 is not greater than 3%, profile decision generator 304 determines if failure ratio 606-3 meets a threshold, such as whether it is greater than 8%. If failure ratio 606-3 is greater than 8%, profile decision generator 304 at 814 selects profile subset C. Profile decision generator 304 may select profile subset C instead of profile subset D to reduce the number of failures when downloading segments. Profile subset C may result in fewer failures because the bitrate distribution is lower than profile subset D.

If failure ratio 606-3 is greater than 8%, at 816, profile decision generator 304 selects profile subset D. In this case, network metrics prediction 204 has passed all the rules and the highest bitrate distribution in the profile subsets is selected. Although the above logic is described, other logic may be used, such as testing multiple threshold for each metric.

In-Session Adaptive Profile Decision

Figure 9:
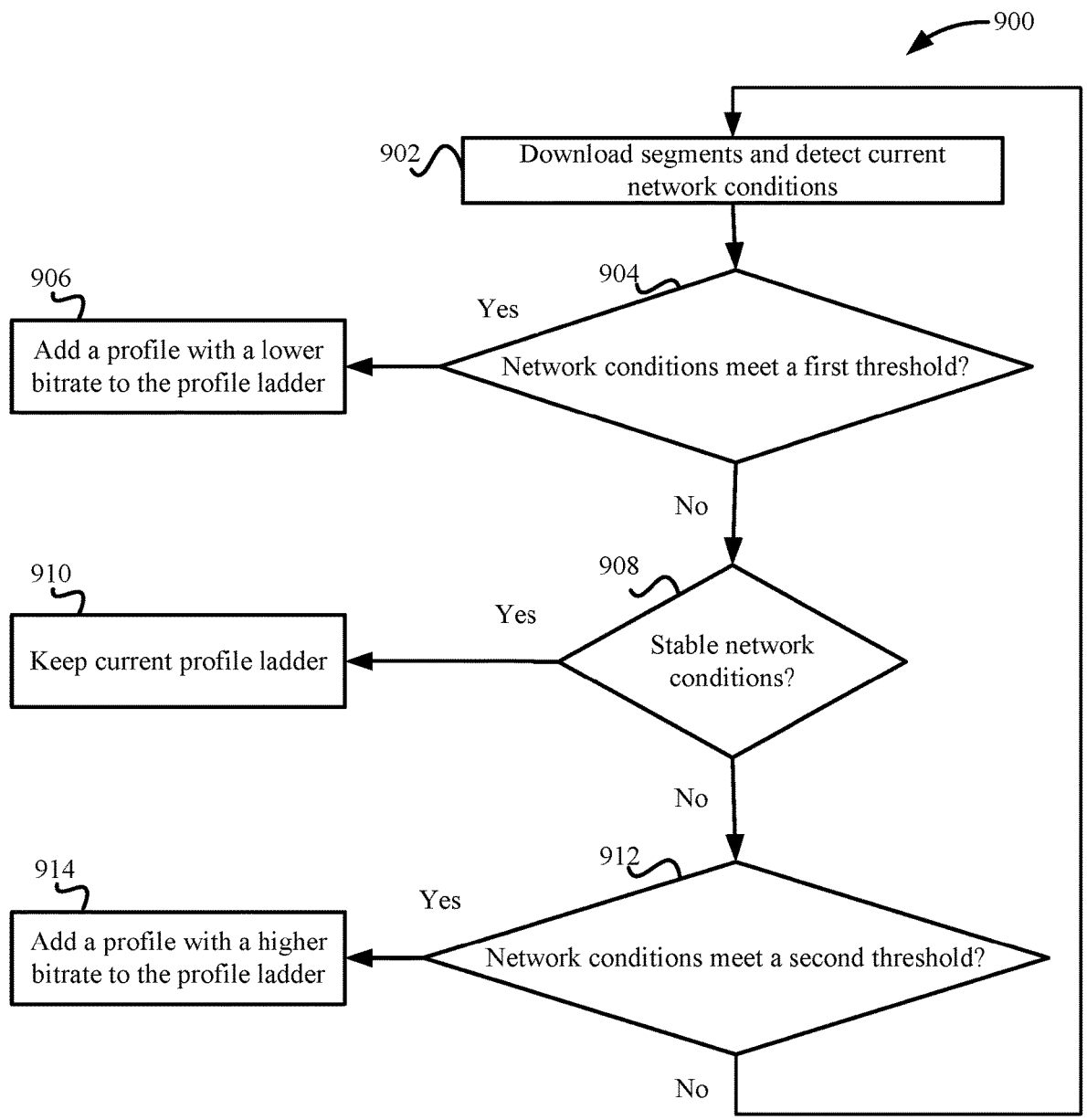
FIG. 9 depicts a simplified flowchart of a method for adapting the profile ladder during the playback session according to some embodiments.

Video delivery system 102 determines the initial profile ladder before the session starts. However, once playback begins, it is possible that the network conditions may change. That is, video delivery system 102 uses predicted network conditions to generate the profile ladder, but not the actual network conditions that may be experienced during the session. Accordingly, it is possible that the subset of profiles for the profile ladder may not be appropriate once network conditions change. FIG. 9 depicts a simplified flowchart 900 of a method for adapting the profile ladder during the playback session according to some embodiments. Although this process to adapt the profile ladder is described, other processes may be used.

At 902, client 104 downloads segments of the video and detects the current network conditions. Current network conditions may include available bandwidth, the rebuffer ratio, and the failure ratio for the current session. At 904, in-session profile adapter 110 determines if the network conditions meet a first threshold. For example, the threshold may be based on minimum network conditions that should be experienced, such as the bitrate should be above a threshold, the rebuffer ratio should be below a threshold, and the failure ratio should be below a threshold. The test may require one or more of the metrics to meet the respective thresholds. For the bitrate, the test may require the current network bandwidth to be above a threshold of the lowest bitrate in the profile.

If the network conditions meet a first threshold, at 906, in-session profile adapter 110 adds a profile with a lower bitrate to the profile ladder, such as a profile with a lower bitrate than the lowest bitrate presently existing in the profile ladder, or a profile with a next lowest bitrate to the lowest bitrate currently in the profile ladder. In some embodiments, in-session profile adapter 110 can add profiles to the profile ladder without restrictions. In other examples, the profile ladder may restrict the number of profiles and in-session profile adapter 110 may remove a profile with a higher bitrate when adding a lower bitrate profile.

If the network conditions do not meet the first threshold, at 908, in-session profile adapter 110 determines if stable network conditions are occurring. Stable network conditions may occur if the current bandwidth, the rebuffer ratio, and the failure ratio are within a threshold or a range of thresholds. The test may require one or more of the metrics to meet the respective thresholds. For example, if the current bitrate is in between the lowest bitrate and the highest bitrate in the profile ladder, stable network conditions may be determined. At 910, if stable network conditions are occurring, then in-session profile adapter 110 keeps the current profile ladder.

If stable network conditions are not occurring, at 912, in-session profile adapter 110 determines if network conditions meet a second threshold. For example, the available bandwidth may be greater than the highest bitrate of profiles in the profile ladder.

At 914, if the network conditions meet the second threshold, in-session profile adapter 110 adds a profile with a higher bitrate to the profile ladder. For example, if the current available bandwidth is 12000 kbps, then in-session profile adapter 110 may add the profile with 12000 kbps to the profile ladder or the next highest bitrate above the highest bitrate in the profile ladder. If the network conditions do not meet the second threshold, then the process reiterates to 902 to continue to download segments and detect current network conditions.

Figure 10:
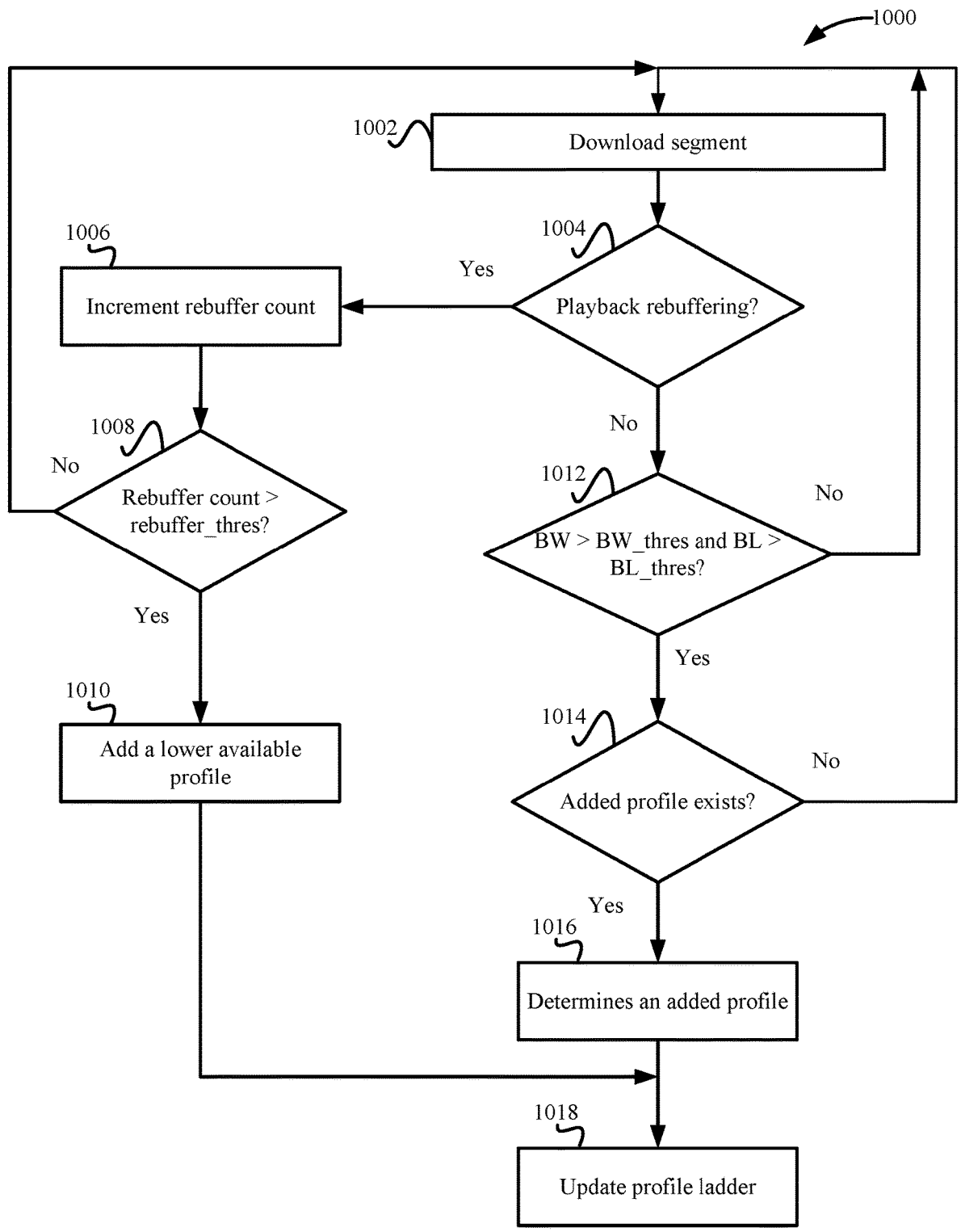
FIG. 10 depicts an example of adding a lower bitrate for a profile to the profile ladder according to some embodiments.

FIG. 10 depicts an example of adding a lower bitrate for a profile to the profile ladder according to some embodiments. At 1002, client 104 downloads a segment. At 1004, in-session profile adapter 110 determines whether playback rebuffering occurs. If so, at 1006, in-session profile adapter 110 implements a rebuffer count. The rebuffer count may count the number of rebuffer occurrences for the session. At 1008, in-session profile adapter 110 determines if the rebuffer count is greater than a threshold rebuffer_thres. If the rebuffer count is not greater than the rebuffer threshold, then the process reiterates to 1002 to download another segment.

If playback rebuffering did not occur, then at 1012, in-session profile adapter 110 determines if the bandwidth is greater than a bandwidth threshold BW_thres and/or a buffer length is greater than a buffer threshold BL_thres. In-session profile adapter 110 compares the available bandwidth against the bandwidth threshold to determine if a higher bandwidth is being experienced. Also, in-session profile adapter 110 compares the buffer length to the buffer-length threshold to determine if there is enough video in the buffer to handle a lower bandwidth for a certain amount of time. The buffer is used to store segments of video when they are received, and the media player reads segments out of the buffer. If the available bandwidth goes down, there still may be enough video stored in the buffer such that rebuffering may not occur for a time period until the available bandwidth increases again.

If the available bandwidth is greater than the bandwidth threshold and the buffer length is greater than the buffer length threshold, at 1014, in-session profile adapter 110 determines if a profile has been added to the profile ladder, such as in-session profile adapter 110 had added another profile with a lower bitrate. If not, the process reiterates to 1002 to analyze another downloaded segment. If an added profile exists, at 1016, in-session profile adapter 110 may remove the added profile. For example, in-session profile adapter 110 may remove the added profile with the lowest bitrate. This profile may not be needed if the available bandwidth is above the threshold or if there is enough video data in the buffer to handle the lower bandwidth. Then, at 1018, in-session profile adapter 110 updates the profile ladder by removing the profile from the ladder. The removal of the added profile may not allow client 104 to select the profile with the lower bitrate, which makes the ladder more efficient because it includes profiles with bitrates that better match the current network conditions.

In-session profile adapter 110 may add or delete a higher profile with a higher bandwidth distribution. For example, if the available bandwidth is higher than the highest profile bitrate in the profile ladder, in-session profile adapter 110 may add a higher profile with a higher bitrate distribution into the profile ladder. However, when the network conditions become worse, the added higher profile actually may not impact the playback experience because the adaptive bitrate algorithm may not select the profile in the case of experiencing low bandwidth. However, considering a limitation of the number of profile ladder, when in-session profile adapter 110 adds a lower profile, in-session profile adapter 110 may remove a higher profile that has been added.

Conclusion

Accordingly, video delivery system 102 uses an adaptive profile ladder for each session. The adaptive profile selects a subset of profiles that may be optimized for the predicted network conditions of the session. If the network conditions change, then an in-session profile adapter 110 may be used to adjust the profile ladder. Accordingly, because the profiles are not fixed and can adapt to network conditions, the quality experienced in the session may be improved. For example, higher bitrates may be requested in the session if profiles with higher bitrates are provided to client 104. Also, rebuffering may be reduced if profiles with lower bitrates are provided to client 104 when it is experiencing a lower bitrate environment.

Example Embodiments

In some embodiments, a method comprising: receiving, by a computing device, session features for a session associated with a request for a video from a client; predicting, by the computing device, network conditions for the session using the session features; selecting, by the computing device, a subset of available profiles based on the network conditions, wherein the available profiles are associated with a different playback characteristic; and providing, by the computing device, a profile ladder that includes the subset of available profiles for the playback of the video to the client, wherein the profile ladder restricts the client to using the subset of available profiles to request segments of the video during the session.

In some embodiments, predicting the network conditions comprises: inputting the session features into a prediction network to predict the network conditions.

In some embodiments, the network conditions comprise at least one of a predicted available bandwidth and a quality of service metric.

In some embodiments, the method further comprising: training a prediction network with historical session features for the client to generate a prediction model to predict the network conditions from the session features.

In some embodiments, selecting the subset of available profiles comprises: selecting a profile subset from a plurality of profile subsets, wherein each profile subset includes a different subset of available profiles.

In some embodiments, selecting the subset of available profiles comprises: predicting the profiles in the subset of available profiles, wherein the subset of available profiles is dynamically predicted without selecting from a fixed profile subset.

In some embodiments, selecting the subset of available profiles comprises: applying a set of rules to the network metrics to select the subset of available profiles.

In some embodiments, selecting the subset of available profiles comprises: applying a set of rules to the network metrics to select one of a plurality of profile subsets, wherein each profile subset includes a different subset of available profiles.

In some embodiments, providing the profile ladder comprises: sending the profile ladder to the client, wherein the client applies a restriction to using the subset of available profiles to request segments of the video during the session.

In some embodiments, providing the profile ladder comprises: sending the profile ladder to a content delivery network, wherein the content delivery network communicates the profile ladder to the client.

In some embodiments, a manifest that is sent to the client includes information for all available profiles for a segment of video, and the client applies a restriction to using the subset of available profiles to request a profile for the segment video.

In some embodiments, the client is allowed to add a profile to the subset of available profiles upon starting playback of the video.

In some embodiments, the client is allowed to remove a profile to the subset of available profiles upon starting playback of the video.

In some embodiments, a non-transitory computer-readable storage medium containing instructions, that when executed, control a computer system to be operable for: receiving session features for a session associated with a request for a video from a client; predicting network conditions for the session using the session features; selecting a subset of available profiles based on the network conditions, wherein the available profiles are associated with a different playback characteristic; and providing a profile ladder that includes the subset of available profiles for the playback of the video to the client, wherein the profile ladder restricts the client to using the subset of available profiles to request segments of the video during the session.

In some embodiments, a method comprising: receiving, by a computing device, a profile ladder that includes a subset of available profiles, wherein the subset of available profiles is determined for a session to playback a video; sending, by a the computing device, a request for a segment of video using a profile in the profile ladder; analyzing, by the computing device, playback conditions for the playback of the video; determining whether to adjust the profile ladder for the session based on the analyzing of the playback conditions; and when it is determined to adjust the profile ladder, adding a profile from the available profiles to the profile ladder or removing a profile from the subset of available profiles.

In some embodiments, determining whether to adjust the profile ladder comprises: maintaining information for rebuffering occurrences during the playback of the video; and adding a profile with a bandwidth that is lower than a profile with a lowest bandwidth in the subset of available profiles.

In some embodiments, determining whether to adjust the profile ladder comprises: determining whether available bandwidth is greater than a threshold; and removing a profile that was previously added to the subset of available profiles.

In some embodiments, determining whether to adjust the profile ladder comprises: determining whether available bandwidth is greater than a threshold and or a buffer length is greater than a threshold; and removing a profile that was previously added to the subset of available profiles.

In some embodiments, determining whether to adjust the profile ladder comprises: adding a profile with a bitrate that is higher than a profile with a highest bitrate in the subset of available profiles.

In some embodiments, the subset of available profiles is predicted based on predicted network conditions for the session.

System

Figure 11:
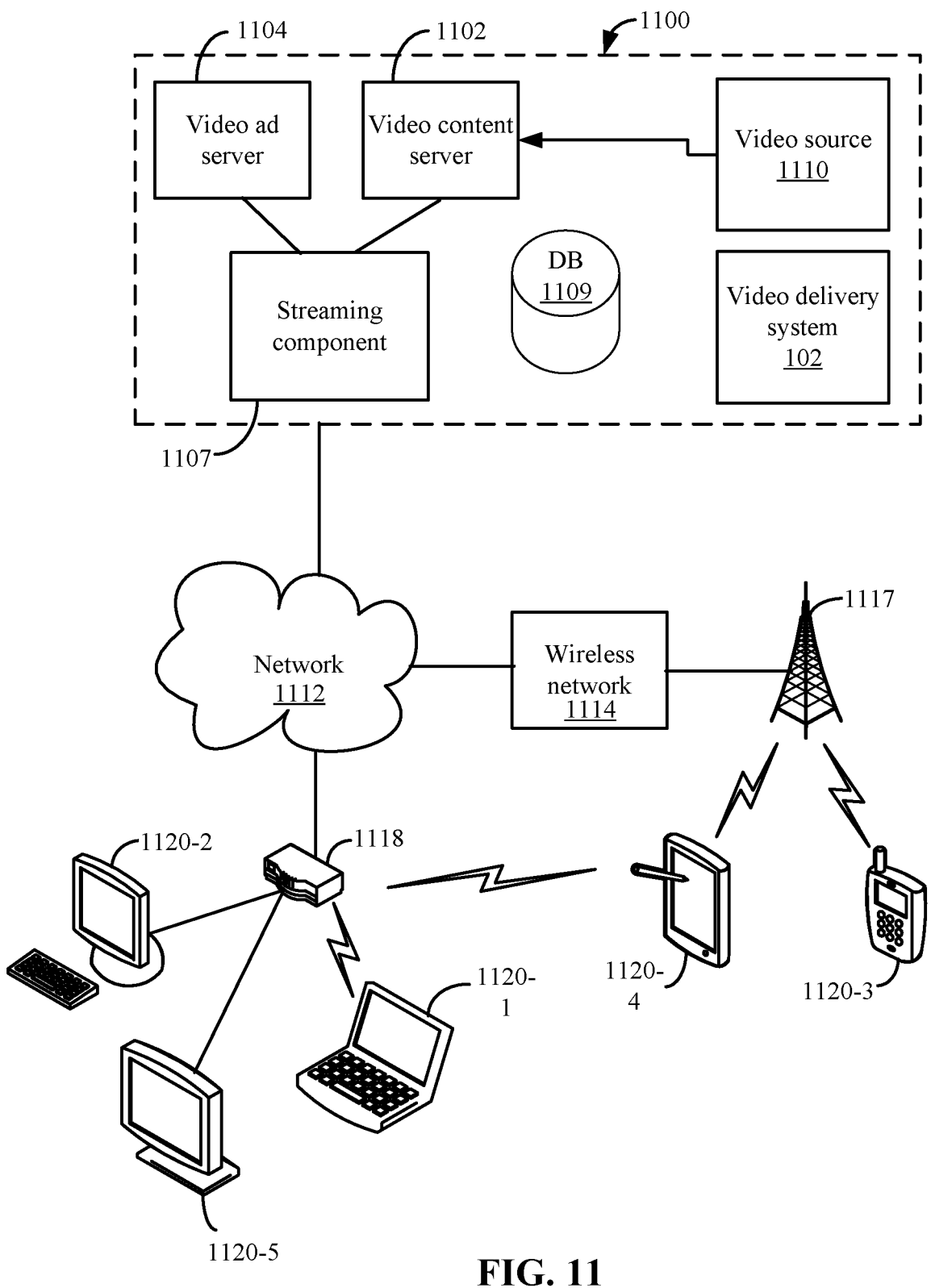
FIG. 11 depicts a video streaming system in communication with multiple client devices via one or more communication networks according to one embodiment.

Features and aspects as disclosed herein may be implemented in conjunction with a video streaming system 1100 in communication with multiple client devices via one or more communication networks as shown in FIG. 11. Aspects of the video streaming system 1100 are described merely to provide an example of an application for enabling distribution and delivery of content prepared according to the present disclosure. It should be appreciated that the present technology is not limited to streaming video applications and may be adapted for other applications and delivery mechanisms.

In one embodiment, a media program provider may include a library of media programs. For example, the media programs may be aggregated and provided through a site (e.g., website), application, or browser. A user can access the media program provider's site or application and request media programs. The user may be limited to requesting only media programs offered by the media program provider.

In system 1100, video data may be obtained from one or more sources for example, from a video source 1110, for use as input to a video content server 1102. The input video data may comprise raw or edited frame-based video data in any suitable digital format, for example, Moving Pictures Experts Group (MPEG)-1, MPEG-2, MPEG-4, VC-1, H.264/Advanced Video Coding (AVC), High Efficiency Video Coding (HEVC), or other format. In an alternative, a video may be provided in a non-digital format and converted to digital format using a scanner and/or transcoder. The input video data may comprise video clips or programs of various types, for example, television episodes, motion pictures, and other content produced as primary content of interest to consumers. The video data may also include audio or only audio may be used.

The video streaming system 1100 may include one or more computer servers or modules 1102, 1104, and/or 1107 distributed over one or more computers. Each server 1102, 1104, 1107 may include, or may be operatively coupled to, one or more data stores 1109, for example databases, indexes, files, or other data structures. A video content server 1102 may access a data store (not shown) of various video segments. The video content server 1102 may serve the video segments as directed by a user interface controller communicating with a client device. As used herein, a video segment refers to a definite portion of frame-based video data, such as may be used in a streaming video session to view a television episode, motion picture, recorded live performance, or other video content.

In some embodiments, a video advertising server 1104 may access a data store of relatively short videos (e.g., 10 second, 30 second, or 60 second video advertisements) configured as advertising for a particular advertiser or message. The advertising may be provided for an advertiser in exchange for payment of some kind or may comprise a promotional message for the system 1100, a public service message, or some other information. The video advertising server 1104 may serve the video advertising segments as directed by a user interface controller (not shown).

The video streaming system 1100 also may include video delivery system 102.

The video streaming system 1100 may further include an integration and streaming component 1107 that integrates video content and video advertising into a streaming video segment. For example, streaming component 1107 may be a content server or streaming media server. A controller (not shown) may determine the selection or configuration of advertising in the streaming video based on any suitable algorithm or process. The video streaming system 1100 may include other modules or units not depicted in FIG. 11, for example, administrative servers, commerce servers, network infrastructure, advertising selection engines, and so forth.

The video streaming system 1100 may connect to a data communication network 1112. A data communication network 1112 may comprise a local area network (LAN), a wide area network (WAN), for example, the Internet, a telephone network, a wireless cellular telecommunications network (WCS) 1114, or some combination of these or similar networks.

One or more client devices 1120 may be in communication with the video streaming system 1100, via the data communication network 1112, wireless cellular telecommunications network 1114, and/or another network. Such client devices may include, for example, one or more laptop computers 1120-1, desktop computers 1120-2, "smart" mobile phones 1120-3, tablet devices 1120-4, network-enabled televisions 1120-5, or combinations thereof, via a router 1118 for a LAN, via a base station 1117 for a wireless cellular telecommunications network 1114, or via some other connection. In operation, such client devices 1120 may send and receive data or instructions to the system 1100, in response to user input received from user input devices or other input. In response, the system 1100 may serve video segments and metadata from the data store 1109 responsive to selection of media programs to the client devices 1120. Client devices 1120 may output the video content from the streaming video segment in a media player using a display screen, projector, or other video output device, and receive user input for interacting with the video content.

Distribution of audio-video data may be implemented from streaming component 1107 to remote client devices over computer networks, telecommunications networks, and combinations of such networks, using various methods, for example streaming. In streaming, a content server streams audio-video data continuously to a media player component operating at least partly on the client device, which may play the audio-video data concurrently with receiving the streaming data from the server. Although streaming is discussed, other methods of delivery may be used. The media player component may initiate play of the video data immediately after receiving an initial portion of the data from the content provider. Traditional streaming techniques use a single provider delivering a stream of data to a set of end users. High bandwidth and processing power may be required to deliver a single stream to a large audience, and the required bandwidth of the provider may increase as the number of end users increases.

Streaming media can be delivered on-demand or live. Streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities via a specialized device that accepts requests for video files, and with information about the format, bandwidth and structure of those files, delivers just the amount of data necessary to play the video, at the rate needed to play it. Streaming media servers may also account for the transmission bandwidth and capabilities of the media player on the destination client. Streaming component 1107 may communicate with client device 1120 using control messages and data messages to adjust to changing network conditions as the video is played. These control messages can include commands for enabling control functions such as fast forward, fast reverse, pausing, or seeking to a particular part of the file at the client.

Since streaming component 1107 transmits video data only as needed and at the rate that is needed, precise control over the number of streams served can be maintained. The viewer will not be able to view high data rate videos over a lower data rate transmission medium. However, streaming media servers (1) provide users random access to the video file, (2) allow monitoring of who is viewing what video programs and how long they are watched (3) use transmission bandwidth more efficiently, since only the amount of data required to support the viewing experience is transmitted, and (4) the video file is not stored in the viewer's computer, but discarded by the media player, thus allowing more control over the content.

Streaming component 1107 may use TCP-based protocols, such as HTTP and Real Time Messaging Protocol (RTMP). Streaming component 1107 can also deliver live webcasts and can multicast, which allows more than one client to tune into a single stream, thus saving bandwidth. Streaming media players may not rely on buffering the whole video to provide random access to any point in the media program. Instead, this is accomplished through the use of control messages transmitted from the media player to the streaming media server. Other protocols used for streaming are Hypertext Transfer Protocol (HTTP) live streaming (HLS) or Dynamic Adaptive Streaming over HTTP (DASH). The HLS and DASH protocols deliver video over HTTP via a playlist of small segments that are made available in a variety of bitrates typically from one or more content delivery networks (CDNs). This allows a media player to switch both bitrates and content sources on a segment-by-segment basis. The switching helps compensate for network bandwidth variances and also infrastructure failures that may occur during playback of the video.

The delivery of video content by streaming may be accomplished under a variety of models. In one model, the user pays for the viewing of video programs, for example, paying a fee for access to the library of media programs or a portion of restricted media programs, or using a pay-per-view service. In another model widely adopted by broadcast television shortly after its inception, sponsors pay for the presentation of the media program in exchange for the right to present advertisements during or adjacent to the presentation of the program. In some models, advertisements are inserted at predetermined times in a video program, which times may be referred to as "ad slots" or "ad breaks." With streaming video, the media player may be configured so that the client device cannot play the video without also playing predetermined advertisements during the designated ad slots.

Figure 12:
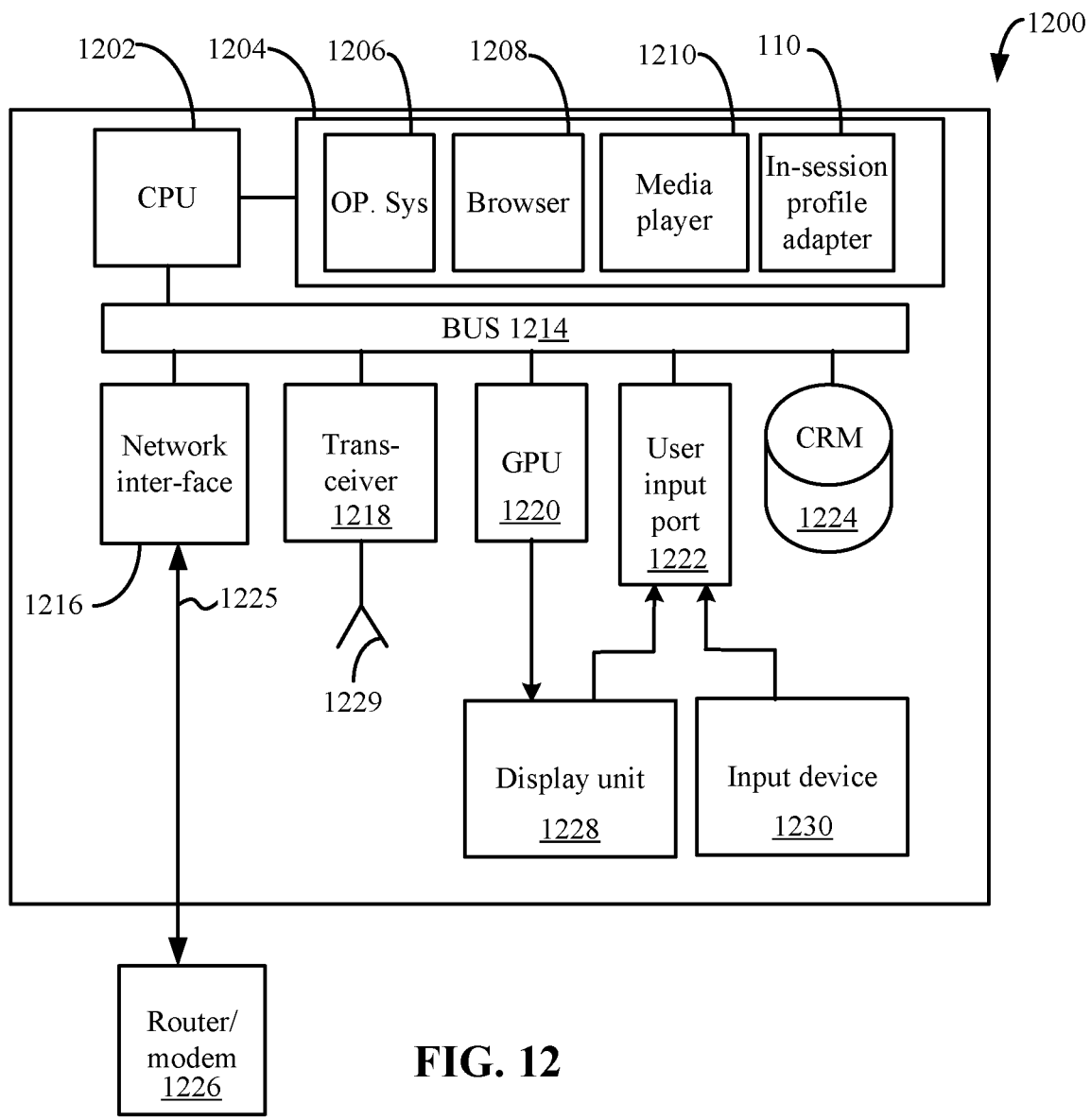
FIG. 12 depicts a diagrammatic view of an apparatus for viewing video content and advertisements.

Referring to FIG. 12, a diagrammatic view of an apparatus 1200 for viewing video content and advertisements is illustrated. In selected embodiments, the apparatus 1200 may include a processor (CPU) 1202 operatively coupled to a processor memory 1204, which holds binary-coded functional modules for execution by the processor 1202. Such functional modules may include an operating system 1206 for handling system functions such as input/output and memory access, a browser 1208 to display web pages, and media player 1210 for playing video. The modules may further include in-session profile adapter 110. The memory 1204 may hold additional modules not shown in FIG. 12, for example modules for performing other operations described elsewhere herein.

A bus 1214 or other communication component may support communication of information within the apparatus 1200. The processor 1202 may be a specialized or dedicated microprocessor configured or operable to perform particular tasks in accordance with the features and aspects disclosed herein by executing machine-readable software code defining the particular tasks. Processor memory 1204 (e.g., random access memory (RAM) or other dynamic storage device) may be connected to the bus 1214 or directly to the processor 1202, and store information and instructions to be executed by a processor 1202. The memory 1204 may also store temporary variables or other intermediate information during execution of such instructions.

A computer-readable medium in a storage device 1224 may be connected to the bus 1214 and store static information and instructions for the processor 1202; for example, the storage device (CRM) 1224 may store the modules 1206, 1208, 1210 and 1212 when the apparatus 1200 is powered off, from which the modules may be loaded into the processor memory 1204 when the apparatus 1200 is powered up. The storage device 1224 may include a non-transitory computer-readable storage medium holding information, instructions, or some combination thereof, for example instructions that when executed by the processor 1202, cause the apparatus 1200 to be configured or operable to perform one or more operations of a method as described herein.

A communication interface 1216 may also be connected to the bus 1214. The communication interface 1216 may provide or support two-way data communication between the apparatus 1200 and one or more external devices, e.g., the streaming system 1100, optionally via a router/modem 1226 and a wired or wireless connection. In the alternative, or in addition, the apparatus 1200 may include a transceiver 1218 connected to an antenna 1229, through which the apparatus 1200 may communicate wirelessly with a base station for a wireless communication system or with the router/modem 1226. In the alternative, the apparatus 1200 may communicate with a video streaming system 1100 via a local area network, virtual private network, or other network. In another alternative, the apparatus 1200 may be incorporated as a module or component of the system 1100 and communicate with other components via the bus 1214 or by some other modality.

The apparatus 1200 may be connected (e.g., via the bus 1214 and graphics processing unit 1220) to a display unit 1228. A display 1228 may include any suitable configuration for displaying information to an operator of the apparatus 1200. For example, a display 1228 may include or utilize a liquid crystal display (LCD), touchscreen LCD (e.g., capacitive display), light emitting diode (LED) display, projector, or other display device to present information to a user of the apparatus 1200 in a visual display.

One or more input devices 1230 (e.g., an alphanumeric keyboard, microphone, keypad, remote controller, game controller, camera, or camera array) may be connected to the bus 1214 via a user input port 1222 to communicate information and commands to the apparatus 1200. In selected embodiments, an input device 1230 may provide or support control over the positioning of a cursor. Such a cursor control device, also called a pointing device, may be configured as a mouse, a trackball, a track pad, touch screen, cursor direction keys or other device for receiving or tracking physical movement and translating the movement into electrical signals indicating cursor movement. The cursor control device may be incorporated into the display unit 1228, for example using a touch sensitive screen. A cursor control device may communicate direction information and command selections to the processor 1202 and control cursor movement on the display 1228. A cursor control device may have two or more degrees of freedom, for example allowing the device to specify cursor positions in a plane or three-dimensional space.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured or operable to perform that which is described in some embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments and are presented to illustrate the flexibility and advantages of some embodiments as defined by the following claims. Based on the above disclosure and the following claims, other arrangements, embodiments, implementations, and equivalents may be employed without departing from the scope hereof as defined by the claims.

What is claimed is:

1. A method comprising:
receiving, by a computing device, session features for a session associated with a request for a video from a client;
predicting, by the computing device, network conditions for the session using the session features;
determining, by the computing device, available profiles, wherein profiles in the available profiles are associated with a different playback characteristic;
selecting, by the computing device, a subset of the available profiles based on the network conditions; and
providing, by the computing device, a profile ladder that includes the subset of the available profiles for playback of the video to the client, wherein the profile ladder restricts the client to using the subset of the available profiles to request segments of the video during the session, wherein a profile that is in the available profiles, but not in the subset of the available profiles, is configured to be added to the subset of the available profiles by the client based upon detection of current network conditions from downloading segments from the video.

2. The method of claim 1, wherein predicting the network conditions comprises:
inputting the session features into a prediction network to predict the network conditions.

3. The method of claim 1, wherein the network conditions comprise at least one of a predicted available bandwidth and a quality of service metric.

4. The method of claim 1, further comprising:
training a prediction network with historical session features for the client to generate a prediction model to predict the network conditions from the session features.

5. The method of claim 1, wherein selecting the subset of available profiles comprises:
selecting a profile subset from a plurality of profile subsets, wherein each profile subset includes a different subset of the available profiles.

6. The method of claim 1, wherein selecting the subset of the available profiles comprises:
predicting the profiles in the subset of the available profiles, wherein the subset of the available profiles is dynamically predicted without selecting from a fixed profile subset.

7. The method of claim 1, wherein selecting the subset of the available profiles comprises:
applying a set of rules to the network conditions to select the subset of the available profiles.

8. The method of claim 1, wherein selecting the subset of the available profiles comprises:
applying a set of rules to the network conditions to select one of a plurality of profile subsets, wherein each profile subset includes a different subset of the available profiles.

9. The method of claim 1, wherein providing the profile ladder comprises:
sending the profile ladder to the client, wherein the client applies a restriction to using the subset of the available profiles to request segments of the video during the session.

10. The method of claim 1, wherein providing the profile ladder comprises:
sending the profile ladder to a content delivery network, wherein the content delivery network communicates the profile ladder to the client.

11. The method of claim 1, wherein:
a manifest that is sent to the client includes information for all available profiles for a segment of video, and
the client applies a restriction to using the subset of the available profiles to request a profile for the segment video.

12. The method of claim 11, wherein the client adjusts the restriction to add the profile to the subset of the available profiles.

13. The method of claim 1, wherein the client is allowed to add a profile to the subset of available profiles upon starting playback of the video.

14. The method of claim 1, wherein the client is allowed to remove a profile to the subset of the available profiles upon starting playback of the video.

15. A non-transitory computer-readable storage medium containing instructions, that when executed, control a computer system to be operable for:
receiving session features for a session associated with a request for a video from a client;
predicting network conditions for the session using the session features;
determining available profiles, wherein profiles in the available profiles are associated with a different playback characteristic;
selecting a subset of the available profiles based on the network conditions; and
providing a profile ladder that includes the subset of the available profiles for playback of the video to the client, wherein the profile ladder restricts the client to using the subset of the available profiles to request segments of the video during the session, wherein a profile that is in the available profiles, but not in the subset of the available profiles, is configured to be added to the subset of the available profiles by the client based upon detection of current network conditions from downloading segments from the video.

16. A method comprising:
receiving, by a computing device, a profile ladder that includes a subset of available profiles, wherein the subset of available profiles is determined for a session to playback a video;
determining, by the computing device, the available profiles for the session;
sending, by the computing device, a request for a segment of video using a profile in the profile ladder and playing back the segment of video;
analyzing, by the computing device, playback conditions for the playback of the video;
determining, by the computing device, to adjust the profile ladder for the session based on the analyzing of the playback conditions; and
adding, by the computing device, a profile from the available profiles to the profile ladder or removing a profile from the subset of available profiles based on the analyzing.

17. The method of claim 16, wherein determining whether to adjust the profile ladder comprises:
   maintaining information for rebuffering occurrences during the playback of the video; and
   adding a profile with a bandwidth that is lower than a profile with a lowest bandwidth in the subset of available profiles.

18. The method of claim 16, wherein determining whether to adjust the profile ladder comprises:
   determining whether available bandwidth is greater than a threshold; and
   removing a profile that was previously added to the subset of available profiles.

19. The method of claim 16, wherein determining whether to adjust the profile ladder comprises:
   determining whether available bandwidth is greater than a threshold or a buffer length is greater than a threshold; and
   removing a profile that was previously added to the subset of available profiles.

20. The method of claim 16, wherein determining whether to adjust the profile ladder comprises:
   adding a profile with a bitrate that is higher than a profile with a highest bitrate in the subset of available profiles.

21. The method of claim 16, wherein the subset of available profiles is predicted based on predicted network conditions for the session.

22. The method of claim 16, wherein:
   a manifest is received that includes information for all available profiles for a segment of video, and
   the profile is added to the profile ladder by adjusting a restriction that restricts the computing device to requesting profiles in the subset of available profiles using the manifest.

* * * * *